United States Patent [19]
Barkus et al.

[11] 4,332,849
[45] Jun. 1, 1982

[54] COLD SHRINK CABLE REPAIR DEVICE

[75] Inventors: Lee A. Barkus, Millersburg; Craig W. Simons, New Cumberland, both of Pa.

[73] Assignee: AMP Incorporated, Harrisburg, Pa.

[21] Appl. No.: 211,018

[22] Filed: Nov. 28, 1980

[51] Int. Cl.³ .......................... B32B 1/08; B32B 3/02
[52] U.S. Cl. ............................. 428/188; 138/DIG. 5; 156/298; 156/303.1; 156/304.5; 174/DIG. 8; 428/36; 428/60; 428/192; 428/294
[58] Field of Search ................. 428/60, 36, 188, 294, 428/130, 167, 192, 123; 138/99, DIG. 5; 264/230; 174/DIG. 8; 156/84–86, 247, 298, 303.1, 304.1, 304.5

[56] References Cited

U.S. PATENT DOCUMENTS 4,070,746  1/1978  Evans et al. .................... 156/344
4,179,320 12/1979  Midgley et al. ................. 156/86
4,233,731 11/1980  Clabburn et al. ............... 156/86

Primary Examiner—Paul J. Thibodeau
Attorney, Agent, or Firm—Allan B. Osborne

[57] ABSTRACT

The present invention relates to a device which is used to repair a damaged insulating jacket on an electrical cable. The device is shrunk down around the cable without the use of heat to provide an impervious, protective covering. More particularly, the invention includes a sheet or sleeve which is elongated and held in that state by removable support struts. After covering the damaged area of the cable jacket, the struts are withdrawn to allow the sheet or sleeve to shrink down around the cable.

5 Claims, 6 Drawing Figures

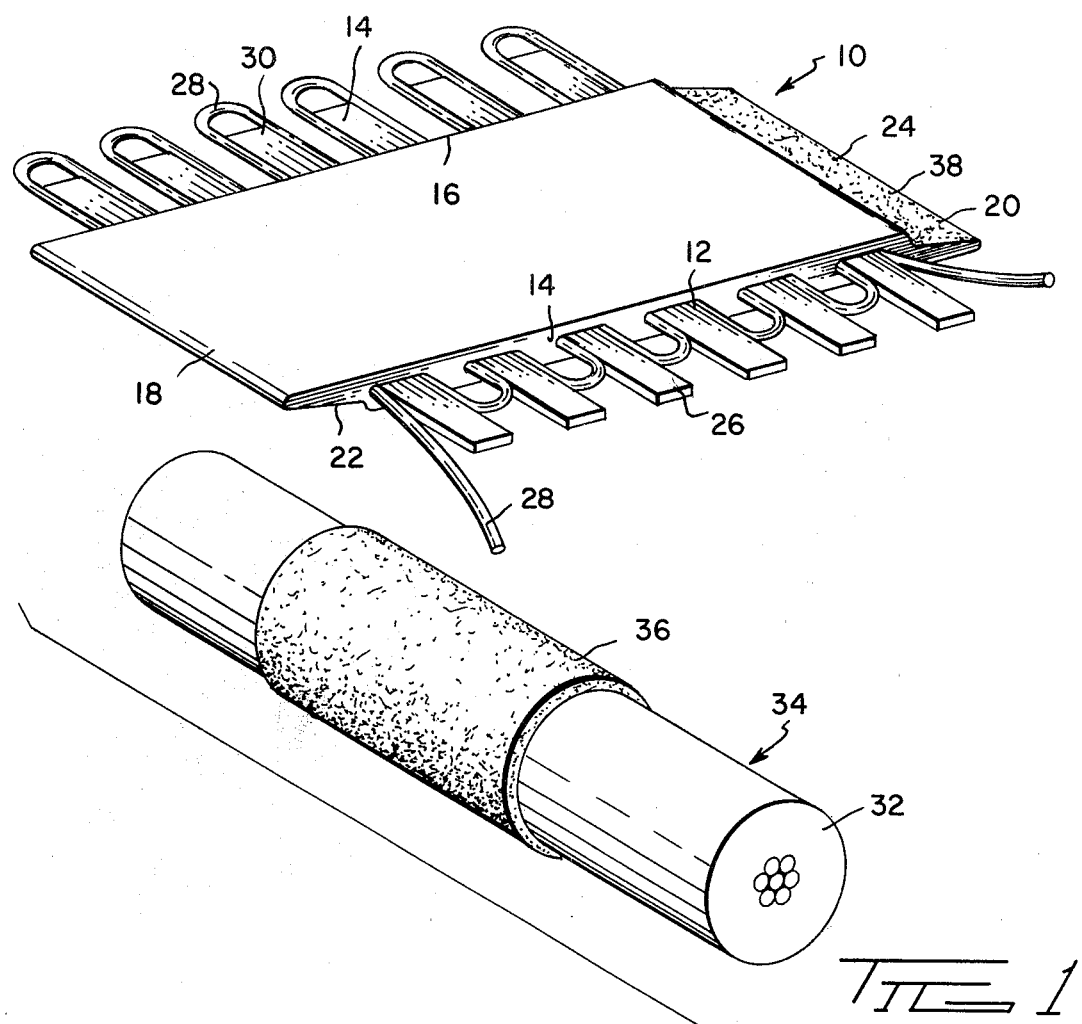
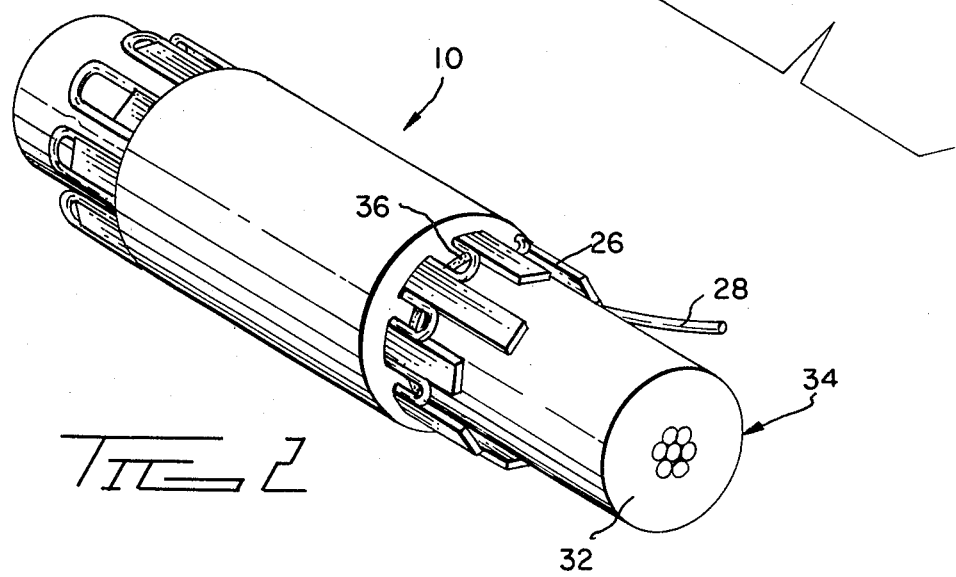

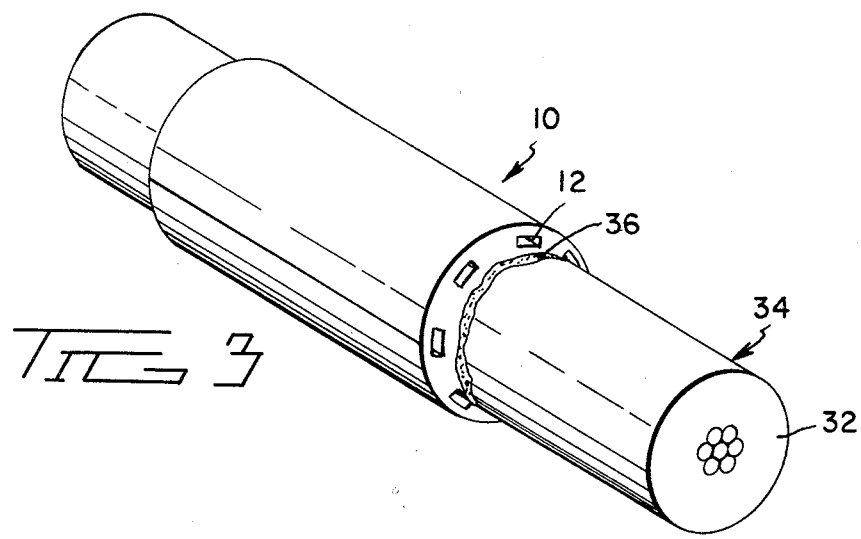
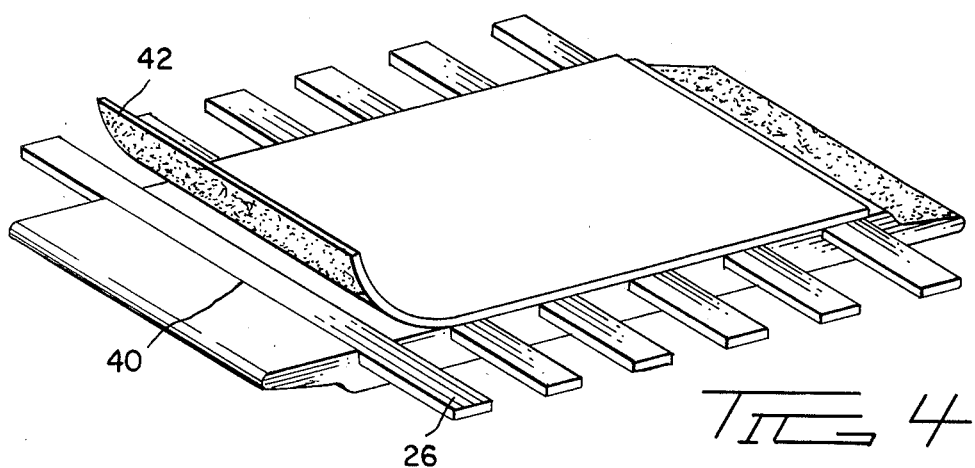
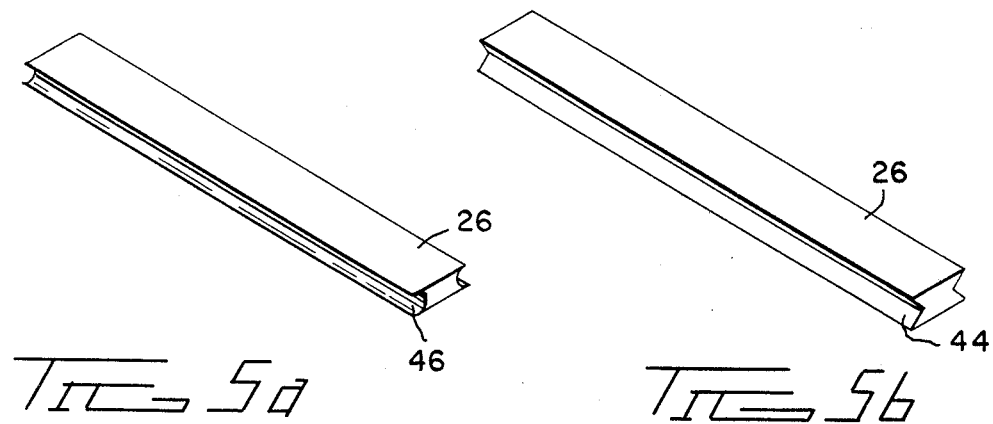

COLD SHRINK CABLE REPAIR DEVICE

BACKGROUND OF THE INVENTION

1. The Field Of The Invention

The present invention relates to devices for repairing a damaged insulating jacket covering an electrical cable such as found in underground mining operations.

2. The Prior Art

A device for use in repairing cables is disclosed in U.S. Pat. No. 4,179,320. The device includes a sleeve of an elastomeric material which is mechanically expanded and held in the expanded state by securing its outer surface to the inner surface of a relatively rigid tube. The retension is by means of an adhesive. The outer tube is scored so that it can be broken and peeled away from the elastomeric sleeve. This is done after the adhesive is weakened by application of a suitable solvent. The elastomeric sleeve shrinks down around the cable as it returns to its pre-expanded size.

SUMMARY OF THE PRESENT INVENTION

The present invention is a device consisting of a sheet of material which is mechanically expanded or elongated and retained in the expanded state by support struts. The material recovers to its original size by removing the struts.

BRIEF DESCRIPTION OF THE DRAWINGS

FIG. 1 is a perspective view of one embodiment constructed in accordance to the concepts of the present invention and a cable being repaired by the embodiment;

FIG. 2 illustrates the first step of placing the embodiment of FIG. 1 around the cable;

FIG. 3 shows the embodiment of FIG. 1 after it has shrunk down around the cable; and FIGS. 4 and 5 illustrate other embodiments constructed in accordance with the concepts of the present invention.

DETAILED DESCRIPTION OF THE PREFERRED EMBODIMENT

Device 10 as shown in FIG. 1 began as a sheet of material such as neoprene. Holes 12 were provided through the material from front side 14 to rear side 16. Left and right ends 18 and 20 were formed into the lap joints as illustrated. As will be observed, bevelled surface 22 on left end 18 faces down in the drawing while bevelled surface 24 on right end 20 faces upwards. Thereafter the sheet was mechanically expanded longitudinally and support struts 26 inserted through holes 12. The width of the rods were pre-determined to equal the width of the holes in their expanded state. Cord 28 was also inserted with the struts in the pattern shown; i.e., the cord is positioned between each longitudinal side of struts 26 and the side walls of holes 12. The cord may be waxed.

After the expanding means (not shown) are removed, the sheet will shrink back a distance about equal to the accumulated widths between struts 26. Thus, the total amount of retained expansion is the accumulated width of struts 26. As should now be apparent to those skilled in the art, retained expansion is a function of the size and number of struts used. A limitation is the amount holes 12 can be elongated. Factors influencing this limitation include original hole size, both thickness and width, and the type of material used.

The method of using device 10 to repair a damaged jacket 32 on cable 34 requires cleaning the jacket around the damaged area and then apply a layer of sealing compound 36 over the area and to both sides thereof. An adhesive 38 is applied to bevelled surfaces 22 and 24 on the ends of the sheet.

Device 10 is now placed around cable 34 and the ends 18-20 joined in overlapping fashion and secured together by the adhesive. Struts 26 are now pulled out of holes 12 by means of pliers (not shown) or similar tool. The presence of cord 28 facilitates struts 26 slipping pass the sidewalls of the holes. In the absence of the cord or some other friction-reducing agent, it would be very difficult to withdraw the struts. After pulling the struts out, cord 28 is also withdrawn. With support from the struts withdrawn, the sheet shrinks down towards its original smaller size. Because of the presence of the cable, total recovery cannot occur, however, and the energy in the sheet from the expansion step exerts a compressive force on the cable. Accordingly, a continuous radial pressure is provided. An environmentally sealed repair is effected between the radial pressure and the applied sealing compound. FIG. 3 illustrates the completed repair to cable 34.

Other methods of use would be to form the device into a tube by securing the two ends together. The tube would be slipped over an end of a cable which, for example, would be spliced to another cable. After splicing the two cables together, the sealing compound would be placed over the splice area and the tube moved over the area and shrunk down by removing the struts.

With respect to FIG. 4, holes 12 are replaced with grooves 40 into which struts 26 are positioned. A piece of tape 42 insures that the struts stay in the grooves during handling and shipping. After the sheet of material has been wrapped around the cable, the tape is removed and struts 26 removed to allow the sheet to shrink down around the cable.

The struts shown in FIGS. 1 and 2 had flat sides. Although that configuration is satisfactory, other side-shapes work better. For example, in the strut embodiment shown in FIG. 5a, the sides have a concave shape, indicated generally by reference numeral 44. The cord is conformably received in the concave surface so that the likelihood of it slipping out of the position between the side walls of hole 12 and the strut is greatly reduced. The strut embodiment shown in FIG. 5—6 employs a V-shaped side surface, indicated by reference numeral 46. This shape also retains the cord in its proper position.

Although the problem solved by the present invention related to electrical cable, other uses for it would include wrapping pipe joints, sealing holes in plastic pipe and so forth. Accordingly, the use thereof is not intended to be restricted to repairing electrical cable.

The present invention may be subject to many modifications and changes without departing from the spirit or essential characteristics thereof. The present embodiments are therefore to be considered in all respects as illustrative and not restrictive of the scope of the invention.

What is claimed is:

1. A device which comprises:
   a. a sheet of material resiliently elongated in one direction and having a plurality of spaced-apart holes extending therethrough in a direction normal to the elongation;
b. a plurality of removable support means positioned in the holes to hold said sheet in the elongated state; and
c. anti-friction means for facilitating the withdrawal of the support means whereupon said sheet returns to its pre-elongated dimensions.

2. The device of claim 1 wherein opposite surfaces at the ends of the sheet are bevelled so that upon bringing the sheet around to join the two ends, the bevelled surfaces form a lap joint of substantially the same thickness as the sheet proper.

3. The device of claim 2 wherein said support means include struts.

4. The device of claim 3 wherein the anti-friction means includes a cord positioned between the support means and the side walls of the holes.

5. The device of claim 4 wherein the sides of the struts are concave.

* * * * *